United States Patent
Popp et al.

(10) Patent No.: US 8,871,134 B2
(45) Date of Patent: Oct. 28, 2014

(54) LABELER FOR LABELING PLASTIC CONTAINERS IN THE BLOW MOLD IN A ROTARY BLOW MOLDER

(75) Inventors: Christian Popp, Regensburg (DE); Werner Britten, Kehlheim (DE); Wolfgang Hausladen, Moetzing (DE)

(73) Assignee: Krones AG, Neutraubling (DE)

( * ) Notice: Subject to any disclaimer, the term of this patent is extended or adjusted under 35 U.S.C. 154(b) by 200 days.

(21) Appl. No.: 13/010,953

(22) Filed: Jan. 21, 2011

(65) Prior Publication Data

US 2011/0183028 A1    Jul. 28, 2011

(30) Foreign Application Priority Data

Jan. 25, 2010   (DE) .......................... 10 2010 001 191

(51) Int. Cl.
*B29C 49/24* (2006.01)
*B29C 49/48* (2006.01)
*B29C 49/36* (2006.01)

(52) U.S. Cl.
CPC ..... *B29C 49/2408* (2013.01); *B29C 2049/2468* (2013.01); *B29C 2049/2412* (2013.01); *B29C 2049/2422* (2013.01); *B29C 2049/4892* (2013.01); *B29C 49/36* (2013.01); *B29C 2049/2485* (2013.01); *B29C 2049/2481* (2013.01); *B29C 2049/247* (2013.01); *B29C 2049/2445* (2013.01)
USPC ......... 264/509; 425/534; 425/540; 425/126.1

(58) Field of Classification Search
CPC .... B29C 49/2408; B29C 49/32; B29C 49/40; B29C 49/4815; B29C 49/24; B23P 21/00
USPC .............. 425/126.1, 503, 522, 534, 538, 540; 264/509, 516, 540, 520; 29/775, 792
See application file for complete search history.

(56) References Cited

U.S. PATENT DOCUMENTS

| 3,212,129 | A | * | 10/1965 | Schuette et al. | 425/377 |
| 5,067,890 | A | * | 11/1991 | Dunlap et al. | 425/504 |
| 5,266,149 | A | | 11/1993 | Collette et al. | |
| 6,183,238 | B1 | * | 2/2001 | Dunlap et al. | 425/503 |

(Continued)

FOREIGN PATENT DOCUMENTS

| DE | 3531974 A1 | * | 3/1987 | B29C 49/52 |
| DE | 19731336 A1 | | 1/1999 | |

(Continued)

OTHER PUBLICATIONS

Translation of WO 2008/018546.*

(Continued)

*Primary Examiner* — Dimple Bodawala
(74) *Attorney, Agent, or Firm* — Marshall, Gerstein & Borun LLP

(57) ABSTRACT

A labeler for labeling plastic containers in the blow mold in a rotary blow molder, with a blow wheel having arranged thereon a plurality of blow molds with a lowerable blow mold bottom, and at least one label dispenser used for providing tubular labels. The blow mold bottom is implemented such that a label can be introduced via the blow mold bottom into the blow mold before the blowing process takes place, which facilitates a spatial separation of the label supply from the feeder star wheel of the blow wheel and allows a substantially simultaneous insertion of the label and of the preform.

9 Claims, 4 Drawing Sheets

(56) References Cited

U.S. PATENT DOCUMENTS

| | | | |
|---|---|---|---|
| 6,264,876 B1 | 7/2001 | Ballay | |
| 6,644,647 B2 * | 11/2003 | Dunlap et al. | 271/11 |
| 6,649,118 B2 * | 11/2003 | Dunlap et al. | 264/509 |
| 6,649,119 B2 | 11/2003 | Dunlap et al. | |
| 7,628,597 B2 * | 12/2009 | Teensma et al. | 425/4 R |
| 7,648,359 B2 * | 1/2010 | Sheng-Chang | 425/503 |
| 7,699,594 B2 * | 4/2010 | Ito | 425/126.1 |
| 8,512,623 B2 * | 8/2013 | Hausladen et al. | 264/509 |
| 8,621,745 B2 * | 1/2014 | Deonarine et al. | 29/775 |
| 2003/0006545 A1 * | 1/2003 | Dunlap et al. | 271/10.01 |
| 2004/0224049 A1 | 11/2004 | Chang | |
| 2007/0017629 A1 * | 1/2007 | Ito | 156/242 |
| 2007/0042144 A1 * | 2/2007 | Teensma et al. | 428/34.2 |
| 2007/0163213 A1 * | 7/2007 | Till | 53/471 |
| 2008/0224049 A1 | 9/2008 | Imai et al. | |
| 2010/0136159 A1 * | 6/2010 | Bernhard | 425/534 |
| 2011/0180974 A1 * | 7/2011 | Hausladen et al. | 264/509 |

FOREIGN PATENT DOCUMENTS

| | | | | |
|---|---|---|---|---|
| DE | 102007014870 A1 | 10/2008 | | |
| EP | 0867268 A1 | 9/1998 | | |
| EP | 1350612 A1 | 10/2003 | | |
| EP | 1810813 A2 | 7/2007 | | |
| JP | 49062562 A | 6/1974 | | |
| JP | 49062562 U | 6/1974 | | |
| JP | 08132520 A | * 5/1996 | | B29C 51/22 |
| JP | 11235730 A | * 8/1999 | | B29C 45/26 |
| WO | WO-0078526 A1 | 12/2000 | | |
| WO | WO 2008/018546 A1 | * 2/2008 | | B29C 49/24 |
| WO | WO-2008116525 A2 | 10/2008 | | |

OTHER PUBLICATIONS

German Search Report for DE 102010001191.6 received Feb. 7, 2011.

European Search Report for EP10194953, dated Oct. 12, 2012.

* cited by examiner

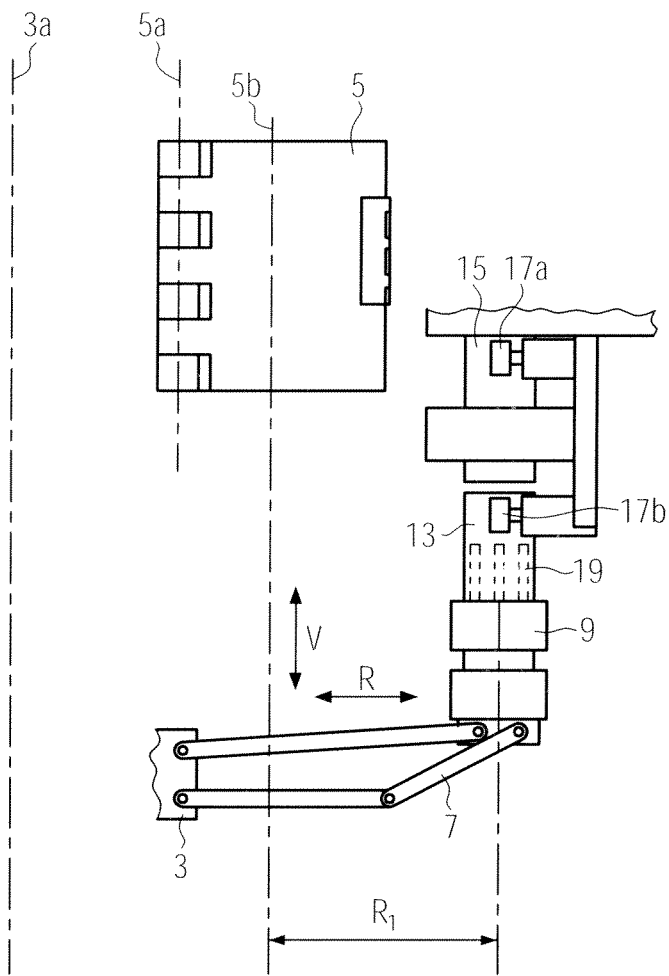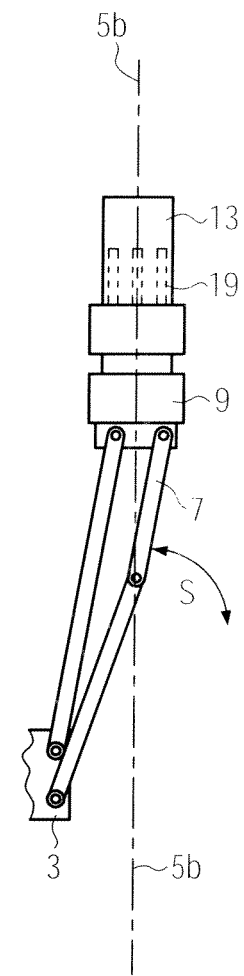
FIG. 1a
FIG. 1b

LABELER FOR LABELING PLASTIC CONTAINERS IN THE BLOW MOLD IN A ROTARY BLOW MOLDER

CROSS-REFERENCE TO RELATED APPLICATION

The present application claims the benefit of priority of German Application No. 102010001191.6, filed Jan. 25, 2010. The entire text of the priority application is incorporated herein by reference in its entirety.

FIELD OF THE DISCLOSURE

The disc sure relates to a labeler for labeling plastic containers in the blow mold in a rotary blow molder.

BACKGROUND

As is generally known, plastic containers, such as PET bottles, can be already be labeled in the course of the production process through so-called in-mold labeling by introducing the labels in the blow mold before blow molding is executed. To this end, the label is laterally introduced in the open blow mold e.g. by grippers, as described in U.S. Pat. No. 6,649,119 B2, U.S. Pat. No. 5,266,149 and WO 00 785 26 A1 for rotary blow molders.

Since the preforms must, however, be inserted in the blow mold as well, the problem arises that the insertion processes must either be executed in succession, which will lead to a decrease in manufacturing efficiency, or that the respective transfer systems necessitate technically complicated structural designs so as to avoid a collision of the grippers. In addition, there is a need for a device which can also be integrated subsequently into already existing blow molders and which takes up as little space as possible.

SUMMARY OF THE DISCLOSURE

It is an aspect of the present disclosure to provide a device for labeling plastic containers in the blow mold, which offers a high process reliability and manufacturing efficiency without entailing these disadvantages.

This aspect is achieved in that the labeler comprises a blow wheel having arranged thereon a plurality of blow molds with a lowerable blow mold bottom, and at least one label dispenser used for providing tubular labels. The blow mold bottom is implemented such that a label can be introduced via the blow mold bottom into the blow mold before the blowing process takes place.

In view of the fact that the label is inserted in the lower portion of the blow mold with the aid of the blow mold bottom, a spatial separation from the feeder star wheel of the blow wheel can be realized with comparatively simple technical means and a substantially simultaneous insertion of the label and of the preform can be accomplished.

Preferably, the blow mold is adapted to be folded open for removing the blown container sideways. This allows a fast removal of the container and a last insertion of the preform.

According to a preferred embodiment, at least one label dispenser is arranged in a stationary manner between a feeder star wheel and a discharge star wheel of the blow wheel. This allows a space-saving structural design.

In accordance with a particularly advantageous embodiment, the blow mold bottom is supported on the blow wheel on a take-out mechanism which is capable of moving the blow mold bottom away from the axis of rotation of the blow wheel to a radial position below the label dispenser. The label dispenser can thus be arranged in direct side-by-side relation with the blow wheel. An additional transfer star wheel for inserting the labels into the blow mold will then not be necessary.

Preferably, the blow mold bottom comprises upwardly extendable pins for holding the label from inside. The label can thus be prevented from slipping on the blow mold bottom or from detaching itself from the blow mold bottom during transfer.

Preferably, at least one pin is provided with a stretching mechanism for the label, which spreads open to the side. The label can thus be held on a predetermined level above the blow mold bottom and positioned in the blow mold folded open.

According to another preferred embodiment, the blow mold bottom can be decoupled from the blow wheel, or the blow mold bottom can comprise a label holder that can be decoupled therefrom. This will facilitate the provision of labels by means of conventional labeling units.

According to a preferred embodiment, the labeler comprises a transfer device used for supplying empty, decoupled blow mold bottoms or label holders to the label dispenser. The provision of labels can thus be spatially separated from the blow wheel.

According to a particularly advantageous further development of the present disclosure, the labeler additionally comprises a rotating insertion device and a rotating removal device which are used for feeding the detachable blow mold bottoms or label holders to the blow wheel and for removing them therefrom. The rotating mode of construction is particularly effective.

Preferably, the insertion device is arranged below a feeder star wheel for preforms and coupled thereto and the removal device is arranged below a discharge star wheel for fully blown plastic containers and coupled thereto. This allows a particularly space-saving arrangement and maximizes the blow wheel process angle that is available for blowing.

According to another preferred embodiment, the label dispenser is integrated in the blow mold bottom. It is thus possible that the blow mold bottom itself dispenses the label. An insertion mechanism with gripper arms will then not be necessary.

Preferably, the blow mold bottom is provided with a centrally floating mandrel defining with a boundary portion of the blow mold bottom an annular gap through which the label can be introduced in the blow mold. It is thus possible to insert the label into the blow mold in tubular form from a roll without cutting it to length previously.

Preferably, a field force hearing is provided in the blow mold bottom so as to support the mandrel in a floating manner. This allows a contact-free and mechanically stable mode of support, which will withstand the blowing pressure without causing damage to the label.

Preferably, the blow wheel has provided thereon at least one storage means for a label sleeve consisting of a plurality of labels. It is thus possible that the label stock rotates together with the blow wheel and the label dispenser can be supplied rapidly and with high process reliability.

Preferably, the blow mold has provided thereon a separating device which separates the inserted label from the label sleeve when the blow mold is being closed. It is thus possible to reliably separate the label without executing any additional operating step and to produce an optically pleasing label edge.

BRIEF DESCRIPTION OF THE DRAWINGS

Preferred embodiments are shown in the drawings, in which:

FIG. 1a shows a schematic side view of a blow mold and of a blow mold bottom lowered to a position below a label dispenser according to a first embodiment;

FIG. 1b shows the blow mold bottom according to FIG. 1a in a raised position;

DETAILED DESCRIPTION OF THE PREFERRED EMBODIMENT

Figure 2:
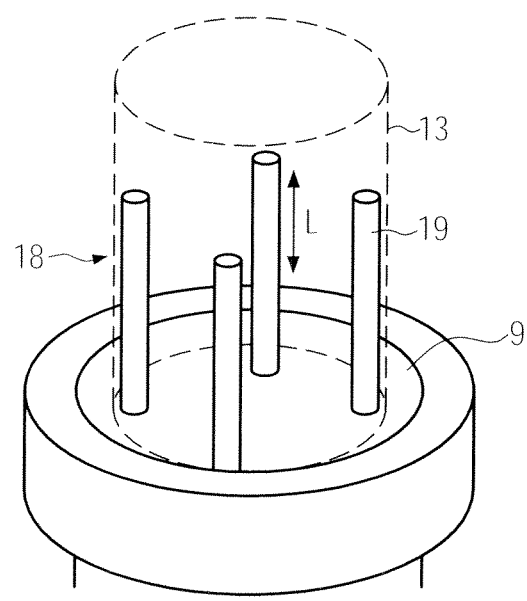
FIG. 2 shows an oblique view of the blow mold bottom according to FIGS. 1a and 1b.

As can be seen from FIGS. 1a and 1b, a first embodiment of the labeler 1 according to the present disclosure comprises a blow wheel 3 which is rotatable about a vertical axis 3a and which is provided with a plurality of blow molds 5 for plastic containers (not shown), such as conventional PET bottles; in FIG. 1a only one blow mold 5 is schematically indicated for the sake of simplicity. The blow molds 5 can be folded open by a swinging opening movement about a vertical axis 5a for inserting a preform with a feeder star wheel and for laterally removing the fully blown bottle with a discharge star wheel.

The blow wheel 3 has, for each bow mold 5, provided thereon a take-out mechanism 7 for the blow mold bottom 9 in the form of a parallel lever which is able to carry out a pivotal movement S away from the blow mold 5, said pivotal movement S comprising a lateral, in particular radial component R and a vertical component V. Preferably, the blow mold bottom simulta-neously lowered and taken out sideways when the blow mold 5 is being opened.

In FIG. 1, the blow mold bottom 9 is located at a lowered and laterally displaced position below a stationary label dispenser 11 for providing tubular labels 13 from the roll. The label dispenser 11 is e.g. a conventional sleeving unit, which advances a label sleeve 15 by means of rolls 17a, opens the compressed sleeve volume, cuts off a label 13 from the sleeve 15 and pushes said label 13 onto the blow mold bottom 9 from above by means of rolls 17b; in the course of this process, the label 13 is stabilized on the blow mold bottom 9 by means of an interior retaining cage 18 in the form of extendable pins 19.

In FIG. 1b, the blow mold bottom 9 is located at a raised and laterally retracted position in the closed condition of the blow mold 5, only the main axis 5b of said blow mold 5 being indicated in FIG. 1b. The pins 19 are partially retracted into the blow mold bottom 9 in FIG. 1b. As can additionally be seen in FIGS. 1a and 1b, the take-out mechanism 7 moves the blow mold bottom 9 to and fro along a radial path R1 between the blow mold 5 and the label dispenser 11.

As indicated in FIG. 2, the retaining cage 18 for the label 13 is defined by e.g. four pins 19. However, the number of pins 19 provided may also deviate from four. The pins 19 can preferably be extended from and retracted into the blow mold bottom 9, as indicated by the arrow L. In the fully retracted position, the pins 19 are preferably flush with the surrounding blow mold bottom 9 so as to impair the shape of the blown bottle to the least possible extent.

The pins 19 are at an extended position while the label 13 is being applied to the blow mold bottom 9 and until the latter is introduced into the blow mold 5 so as to prevent the label 13 from shifting or dropping during transfer to the blow mold 5. Within the blow mold 5 the pins 19 may first remain at an at least partially extended position until the preform has been blown up to such an extent that it will force the label 13 against the blow mold 5, i.e. to the predetermined position within the blow mold 5. For executing the final blowing process, the pins 19 are retracted.

Figure 3:
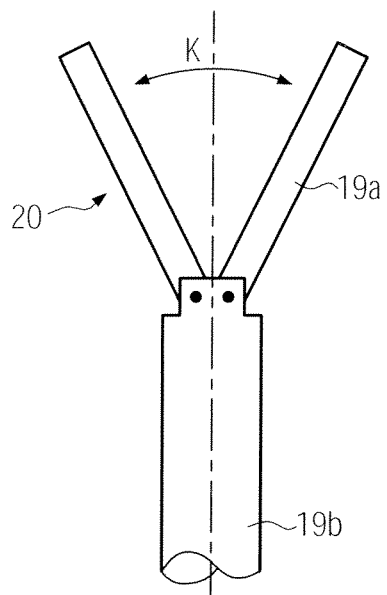
FIG. 3 shows a detail view of a holding pin of the blow mold bottom with a hinged stretching mechanism for a label.

FIG. 3 shows a variant of the pin 19 in the case of which the upper end of the pin 19 is slotted and can be folded open, as indicated by the arrow K. In this case, the foldable pin elements 19a de-fine a stretching mechanism 20 for the label 13 so as to hold the latter on a certain level above the blow mold bottom 9 and transfer it to the blow mold 5 and the expanding preform. To this end, the stretching mechanism 20 may also be defined by individual laterally movable pin elements 19a which extend directly away from the main body 19b of the pin 19. Likewise, the stretching mechanism 20 may be provided on individual pins 19 or on all of the pins 19.

The take-out mechanism 7 may alternatively comprise a linear lifting unit and a laterally ex-tendable and/or pivotable arm for displacing the blow mold bottom 9 up to a point below the label dispenser 11. Other lever mechanisms are imaginable as well.

The position of the blow mold bottom 9 and of the retaining cage 18 may be adjusted e.g. mechanically with the aid of control cams or by means of servomotors.

When seen from the blow wheel 3, the label dispenser 11 is preferably arranged between the feeder star wheel for the preforms and the discharge star wheel for the fully blown bottles. This allows a particularly space-saving structural design. If necessary, a plurality of label dispensers 11 may also be arranged one behind the other.

The first embodiment can be operated as follows:

for removing a fully blown bottle from the blow mold 5 with the aid of the discharge star wheel of the blow wheel, the blow mold is laterally folded open and the blow mold bottom 9 is taken out preferably at the same time. When the bottle has been removed, the pins 19 are extended and the blow mold bottom 9 is fully taken out, if it should not yet be located at the displaced label transfer position shown in FIG. 1a.

The blow wheel 3, which continues to rotate, transfers the blow mold bottom 9 to a position below a label dispenser 11, which pushes a label onto the pins 19. The label 13 is fixed by the pins 19 on the blow mold bottom 9 on the desired level and the blow mold bottom 9 is pivoted back towards the blow mold 5. In the meantime, a preform is conducted to the blow mold 5 by means of the feeder star wheel of the blow wheel 3, whereupon the blow mold 5 is folded and closed again.

Subsequently, the bottle can be blown in the manner known; in the course of this process, the pins 19 can, according to requirements, remain in an at least partially extended position until the label 13 has been fixed in position in the blow mold 5 or on the bottle to be blown. The label 13 should be able to detach itself from the blow mold bottom 9 during the blowing process, so that it will migrate to the bottle location to be labeled during the blowing process due to stretching. Hence, the label 13 will preferably be configured such that its diameter is slightly smaller than that of the fully blown bottle, so that the label 13 will closely fit also to the location with the smallest bottle diameter or will be slightly stretched in diameter. It follows that it is primarily the elongation that holds the label 13 on the fully blown bottle.

In the following, further embodiments of the present disclosure will be described; in so doing, features which the respective embodiments have in common and which have already been described hereinbefore will not be described once more. Likewise, individual features of the embodiments may be combined with one another.

Figure 4:
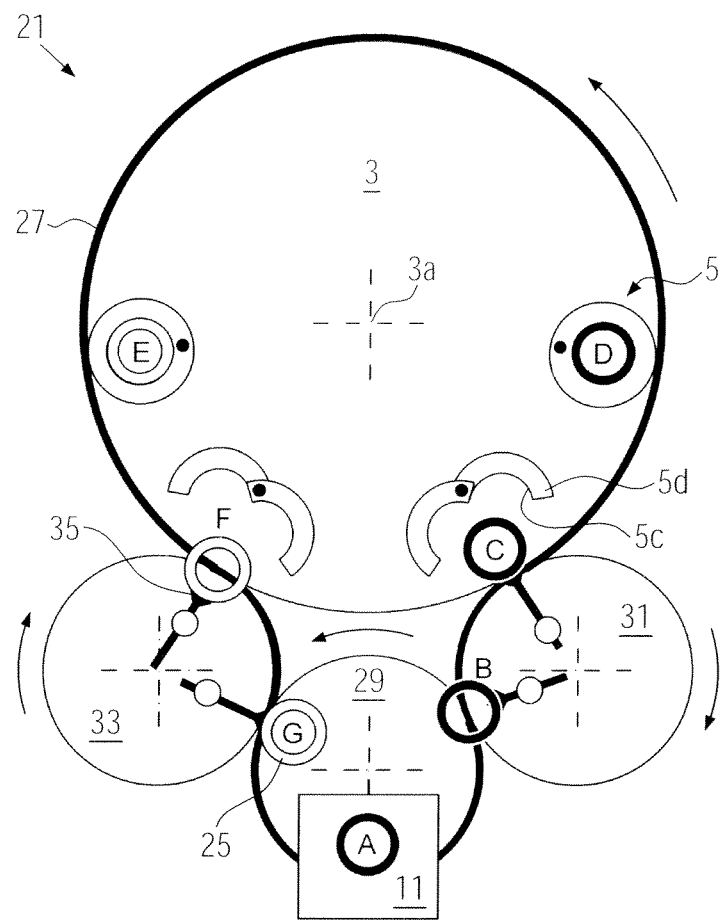
FIG. 4 shows a schematic top view of a second embodiment of the present disclosure.
Figure 5:
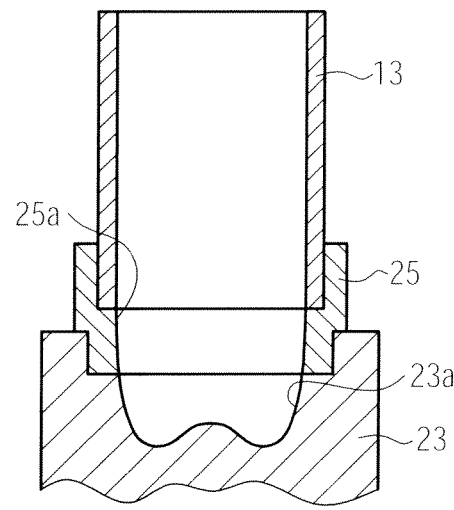
FIG. 5 shows a schematic longitudinal section through a blow mold bottom with a label holder according to the second embodiment.

FIG. 4 shows a schematic top view of a labeler 21 of a second embodiment and FIG. 5 shows a schematic section through the blow mold bottom 23 of the second embodiment with a label holder 25, which is adapted to be decoupled from the blow wheel 3 and the blow mold bottom 23, respectively. The label holder 25 constitutes a part of the blow mold 5, i.e. the inner walls 5c, 23a and 25a of the lateral blow mold halves 5b, the blow mold bottom 23 and the label holder 25 define, in common, the interior of the blow mold 5. The inner walls 5c, 23a and 25a preferably abut on one another such that they are flush with one another.

FIG. 4 additionally illustrates that the label holder 25 is conducted through the labeler 21 in a circuit 27 (in bold print), the label holder 25 passing, in succession, through a rotating transfer device 29, a rotating insertion device 31 for inserting the label holders 25 into the blow molds 5, the blow wheel 3 and a rotating removal device 33 for removing the label holders 25 from the blow molds 5. This is shown on the basis of positions A to G of the label holder 25, label holders 25 carrying labels being depicted as a black ring and empty label holders 25 as a white ring.

Grippers 35 rotating together with the insertion device 31 and the removal device 33 with a circumferentially uniform pitch are provided at said insertion device 31 and said removal device 33 for holding and transferring the label holders 25. The grippers 35 can e.g. be pivotable and/or extendable. The insertion device 31 is preferably arranged coaxially below the feeder star wheel (not shown) for the preforms, the removal device 33 is preferably arranged coaxially below the discharge star wheel (not shown) for the fully blown bottles and both said devices are coupled to the star in question. For the sake of clarity, FIG. 4 only shows the grippers 35 and blow molds 5 arranged at positions B to G.

The mode of operation of the second embodiment is consequently as follows:

The transfer device 29 continuously feeds empty label holders 25 to the label dispenser 11, each of said label holders 25 having supplied thereto a tubular label 13 from above at position A.

At position B, the label holder 25 equipped with the label is taken over by the insertion device 31 and transferred to an opened blow mold 5 at position C. In the course of this process, label holder 25 is brought into positive locking engagement with the blow mold bottom 23 which constitutes part of the blow mold 5 and which has been lowered by a lifting unit (not shown).

Subsequently, the blow mold bottom 23 is raised together with the label holder 25 and the blow mold 5 is closed so that the label 13 will be held by the label holder 25 at the predetermined position at the beginning of the blowing process, as indicated at position D.

The preform is inserted by the feeder star wheel into the blow mold 5 in the manner known, the feeder star wheel and the insertion device 31 being arranged above one another in such a way that the grippers associated therewith, which may e.g. be implemented as pitch adaptation arms, will not collide. This also applies to the discharge star wheel and the removal device 33.

Position E marks the end of the blowing process, when the label 13 is already fitted to the fully blown bottle and need no longer be held by the label holder 25, i.e. has detached itself from the latter. The positioning and fixing of the label 13 on the bottle is essentially carried out in the manner described with respect to the first embodiment.

At position F, the blow mold bottom 23 has already been lowered again and the blow mold 5 has been folded open so that the fully blown bottle can be removed sideways by means of the discharge star wheel and so that the empty label holder 25 is taken over by the removal device 33.

At position G, the removal device 33 re-transfers the empty label holder to the transfer device 29 so that it can be equipped with another label 13.

The label holder 25 can have provided thereon a retaining cage 18. Likewise, it would be possible to decouple the whole blow mold bottom 23 from the blow mold 5 or the blow wheel 3, equip it with a label 13 and conduct it in the circuit 27 as described. In this case, the gripper 35 would decouple the blow mold bottom 23 in a suitable manner from a lifting unit (not shown) on the blow wheel 3 and re-engage it with said lifting unit when a label 13 has been supplied thereto.

As can be seen in FIG. 4, the transfer device 29, which may, where appropriate, also be implemented as a conveyor belt, is arranged between the insertion device 31 and the removal device 33, i.e. between the feeder star wheel and the discharge star wheel of the blow wheel 3. It follows that one or a plurality of label dispensers 11 can be arranged on the blow wheel 3 and, if desired, be integrated in already existing machines.

The second embodiment offers the advantage that the label holder 25, or possibly the blow mold bottom 23, can be equipped with a label 13 in a condition in which it is decoupled from the blow wheel 3. The label holder 25 or the blow mold bottom can thus be equipped with tubular labels 13 more easily. A single label dispenser 11 will suffice for this purpose. In addition, conventional label dispensers, such as sleeving units, can be used.

Figure 6:
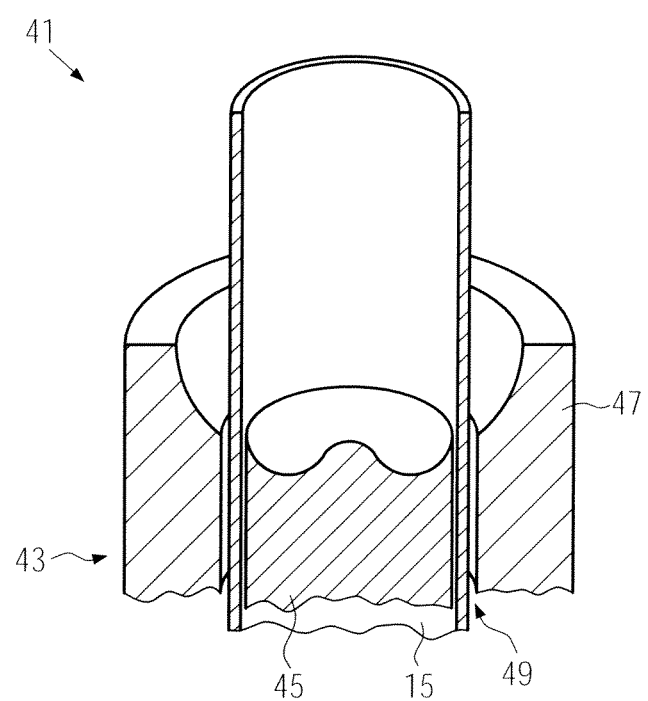
FIG. 6 shows a schematic longitudinal section through a blow mold bottom according to the third embodiment.

As can be seen in FIG. 6, a labeler 41 according to a third embodiment of the present disclosure comprises an at least two-part blow mold bottom 43 with a central mandrel 45 and an outer, annular boundary portion 47. An annular gap 49, through which the label 13 or the label sleeve 15 can be introduced in the blow mold 5 from below, is formed between the mandrel 45 and the boundary portion 47.

The mandrel 45 is mounted in a floating manner in the boundary portion 47 and is held in position e.g. by a field force bearing, e.g. by permanent magnets and/or electromagnets (not shown) in the mandrel 45 and in the boundary portion 47, so that, on the one hand, it will be possible to introduce the label 13 and so that, on the other hand, the position of the mandrel 45 will also be maintained under the influence of the blowing pressure without any damage being caused to the label 13. Alternatively or additionally, it is also imaginable to use a roller mechanism as a bearing.

According to the third embodiment, the label sleeve 15 is stored on the blow wheel 3 on a roll or in a suitable magazine and is dispensed directly from the blow mold bottom 43. Hence, each blow mold 5 has provided thereon its own feed unit or label dispenser 11. The latte can essentially have the structural design shown in FIG. 1a, but it is turned upside down, so that the labels 13 are dispensed from the bottom to the top. The label sleeve 15 is advanced in the interval between removal of the bottle and transfer of the preform in the open condition of the blow mold 5. During removal of the bottle, the label dispenser 11 is lowered together with the blow mold bottom 43.

The labels 13 should preferably not be separated from the label sleeve 15 until the label 13 has been fully inserted in the blow mold 5. Hence, the blow mold 5 may be implemented such that it separates the label 13 from the label sleeve 15 by means of a suitable separating device (not shown) when the blow mold 5 is being closed, such a suitable separating device being e.g. cutting edges formed in the blow mold 5 or on the blow mold bottom 43. Alternatively, it would also be imaginable to circumferentially perforate the label sleeve 15 so that the label 13 will be separated from the sleeve 15 by stretching in the blow mold 5 or during removal of the fully blown bottle.

The invention claimed is:

1. A labeler for labeling plastic containers in blow molds in a rotary blow molder, comprising:
   - a continuously rotatable blow wheel having arranged thereon a plurality of blow molds with a lowerable blow mold bottom, and
   - at least one label dispenser used for providing tubular labels,
   - wherein the blow mold bottom is implemented such that a label can be introduced via the blow mold bottom into the blow mold before a corresponding blowing process takes place, wherein the blow mold bottom comprises upwardly extendable pins for holding the label from an inside of the blow mold, and wherein at least one pin is provided with a means for stretching and holding the label, on a certain level above the blow mold bottom, which label spreads open to the inside of the blow mold.

2. A labeler according to claim 1, wherein the blow mold is adapted to be folded open for removing a blown container sideways.

3. A labeler according to claim 1, wherein the at least one label dispenser is arranged in a stationary manner between a feeder star wheel and a discharge star wheel of the blow wheel.

4. A labeler for labeling plastic containers in blow molds in a rotary blow molder, comprising:
   - a continuously rotatable blow wheel having arranged thereon a plurality of blow molds with a lowerable blow mold bottom, and
   - at least one label dispenser used for providing tubular labels,
   - wherein the blow mold bottom is implemented such that a label can be introduced via the blow mold bottom into the blow mold before a corresponding blowing process takes place, and wherein the blow mold bottom comprises upwardly extendable pins for holding the label from inside, and wherein the pins can be extended from and retracted into the blow mold bottom.

5. A labeler according to claim 1, wherein the label dispenser is integrated in the blow mold bottom.

6. A labeler according to claim 1, wherein the blow wheel has provided thereon at least one storage means for a label sleeve consisting of a plurality of tubular labels.

7. A labeler according to claim 6, wherein the blow mold has provided thereon a separating device which separates the inserted label from the label sleeve when the blow mold is being closed.

8. A labeler according to claim 1, wherein the blow mold bottom is supported on the blow wheel on a take-out mechanism which is capable of moving the blow mold bottom away from the axis of rotation of the blow wheel to a radial position below the label dispenser.

9. A labeler according to claim 4, wherein the blow wheel has provided thereon at least one storage means for a label sleeve consisting of a plurality of tubular labels.

* * * * *